US007381967B2

(12) United States Patent
Bhatt et al.

(10) Patent No.: US 7,381,967 B2
(45) Date of Patent: Jun. 3, 2008

(54) NON-AXISYMMETRIC CHARGED-PARTICLE BEAM SYSTEM

(75) Inventors: Ronak J. Bhatt, Cambridge, MA (US); Chiping Chen, Needham, MA (US); Jing Zhou, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 341 days.

(21) Appl. No.: 11/145,804

(22) Filed: Jun. 6, 2005

(65) Prior Publication Data

US 2006/0017002 A1 Jan. 26, 2006

Related U.S. Application Data

(60) Provisional application No. 60/577,132, filed on Jun. 4, 2004.

(51) Int. Cl.
*B01D 59/44* (2006.01)
*H01J 49/00* (2006.01)

(52) U.S. Cl. .......................... 250/396 ML; 313/346 R; 313/363.1; 315/501; 315/505; 118/50.1; 136/58

(58) Field of Classification Search ................ 250/298, 250/299, 300, 396 ML; 313/346 R, 363.1; 315/501, 505; 118/50.1; 136/58
See application file for complete search history.

(56) References Cited

U.S. PATENT DOCUMENTS 2,410,863 A 11/1946 Broadway et al.
6,670,767 B2 * 12/2003 Villa .................... 315/111.61

FOREIGN PATENT DOCUMENTS

EP 0739492 B 6/2000

OTHER PUBLICATIONS

Basten, M.A. et al., "Magnetic Quadrupole Formation of Elliptical Sheet Electron Beams for High-Power Microwave Devices" IEEE Transactions on Plasma Science, vol. 22, No. 5, Oct. 1994. pp. 960-966.

Basten, M.A. et al., "Two-plane focusing of high-space-charge electron beams using periodically cusped magnetic fields" Journal of Applied Physics, New York, vol. 85, No. 9, May 1999. pp. 6313-6322.

Chen C. et al., "Ideal Matching of Heavy Ion Beams" Nuclear Instruments and Methods in Physics Research, Section A: Accelorators, Spectrometers, Detectors and Associated Equipment, vol. 464, No. 1-3, May 21, 2001. pp. 518-523.

Pierce, J. R., "Rectilinear Electron Flow in Beams," Journal of Applied Physics, Aug. 1940, vol. 11, pp. 548-554.

Pirkle D. R. et al., "Pierce-wiggler electron beam system of 250 GHz gyro-BWO" International Electron Devices Meeting-Technical Digest, Dec. 11, 1988. pp. 159-161.

* cited by examiner

*Primary Examiner*—Jack Berman
*Assistant Examiner*—Meenakshi S Sahu
(74) *Attorney, Agent, or Firm*—Gauthier & Connors LLP

(57) ABSTRACT

The charged-particle beam system includes a non-axisymmetric diode forms a non-axisymmetric beam having an elliptic cross-section. A focusing element utilizes a magnetic field for focusing and transporting the non-axisymmetric beam, wherein the non-axisymmetric beam is approximately matched with the channel of the focusing element.

32 Claims, 13 Drawing Sheets

NON-AXISYMMETRIC CHARGED-PARTICLE BEAM SYSTEM

PRIORITY INFORMATION

This application claims priority from provisional application Ser. No. 60/577,132 filed Jun. 4, 2004, which is incorporated herein by reference in its entirety.

BACKGROUND OF THE INVENTION

The invention relates to the field of charged-particle systems, and in particular to a non-axisymmetric charged-particle system.

The generation, acceleration and transport of a high-brightness, space-charge-dominated, charged-particle (electron or ion) beam are the most challenging aspects in the design and operation of vacuum electron devices and particle accelerators. A beam is said to be space-charge-dominated if its self-electric and self-magnetic field energy is greater than its thermal energy. Because the beam brightness is proportional to the beam current and inversely proportional to the product of the beam cross-sectional area and the beam temperature, generating and maintaining a beam at a low temperature is most critical in the design of a high-brightness beam. If a beam is designed not to reside in an equilibrium state, a sizable exchange occurs between the field and mean-flow energy and thermal energy in the beam. When the beam is space-charge-dominated, the energy exchange results in an increase in the beam temperature (or degradation in the beam brightness) as it propagates.

If brightness degradation is not well contained, it can cause beam interception by radio-frequency (RF) structures in vacuum electron devices and particle accelerators, preventing them from operation, especially from high-duty operation. It can also make the beam from the accelerator unusable because of the difficulty of focusing the beam to a small spot size, as often required in accelerator applications.

The design of high-brightness, space-charge-dominated, charged-particle beams relies on equilibrium beam theories and computer modeling. Equilibrium beam theories provide the guideline and set certain design goals, whereas computer modeling provides detailed implementation in the design.

While some equilibrium states are known to exist, matching them between the continuous beam generation section and the continuous beam transport section has been a difficult task for beam designers and users, because none of the known equilibrium states for continuous beam generation can be perfectly matched into any of the known equilibrium states for continuous beam transport.

For example, the equilibrium state from the Pierce diode in round two dimensional (2D) geometry cannot be matched into a periodic quadrupole magnetic field to create a Kapachinskij-Vladimirskij (KV) beam equilibrium. A rectangular beam made by cutting off the ends of the equilibrium state from the Pierce diode in infinite, 2D slab geometry ruins the equilibrium state.

However, imperfection of beam matching in the beam system design yields the growth of beam temperature and the degradation of beam brightness as the beam propagates in an actual device.

SUMMARY OF THE INVENTION

According to one aspect of the invention, there is provided a charged-particle beam system. The charged-particle beam system includes a non-axisymmetric diode which forms a non-axisymmetric beam having an elliptic cross-section. A focusing channel utilizes a magnetic field for focusing and transporting a non-axisymmetric beam,.

According to another aspect of the invention, there is provided a non-axisymmetric diode. The non-axisymmetric diode comprises at least one electrical terminal for emitting charged-particles and at least one electrical terminal for establishing an electric field and accelerating charged-particles to form a charged-particle beam. These terminals are arranged such that the charged-particle beam possesses an elliptic cross-section.

According to another aspect of the invention, there is provided a method of forming a non-axisymmetric diode comprising forming at least one electrical terminal for emitting charged-particles, forming at least one electrical terminal for establishing an electric field and accelerating charged-particles to form a charged-particle beam, and arranging said terminals such that the charged-particle beam possesses an elliptic cross-section.

According to another aspect of the invention, there is provided a charged-particle focusing and transport channel wherein a non-axisymmetric magnetic field is used to focus and transport a charged-particle beam of elliptic cross-section.

According to another aspect of the invention, there is provided a method of designing a charged-particle focusing and transport channel wherein a non-axisymmetric magnetic field is used to focus and transport a charged-particle beam of elliptic cross-section.

According to another aspect of the invention, there is provided a method of designing an interface for matching a charged-particle beam of elliptic-cross section between a non-axisymmetric diode and a non-axisymmetric magnetic focusing and transport channel.

According to another aspect of the invention, there is provided a method of forming a charged-particle beam system. The method includes forming a non-axisymmetric diode that includes a non-axisymmetric beam having an elliptic cross-section. Also, the method includes forming a focusing channel that utilizes a magnetic field for focusing and transporting the elliptic cross-section beam.

DETAILED DESCRIPTION OF THE INVENTION

The invention comprises a non-axisymmetric charged-particle beam system having a novel design and method of design for non-axisymmetric charged-particle diodes.

Figure 1A:
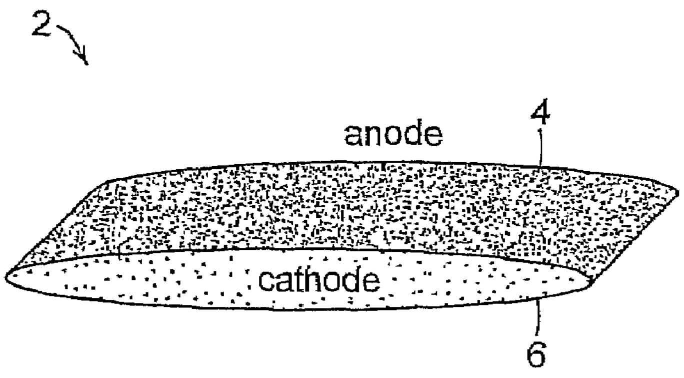
FIGS. 1A-1C are schematic diagrams demonstrating a non-axisymmetric diode.
Figure 1B:
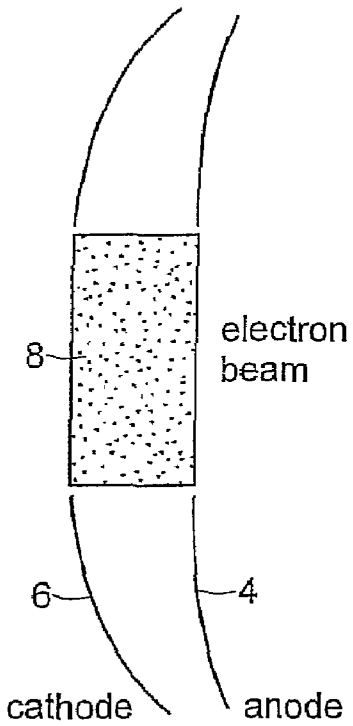
Figure 1C:
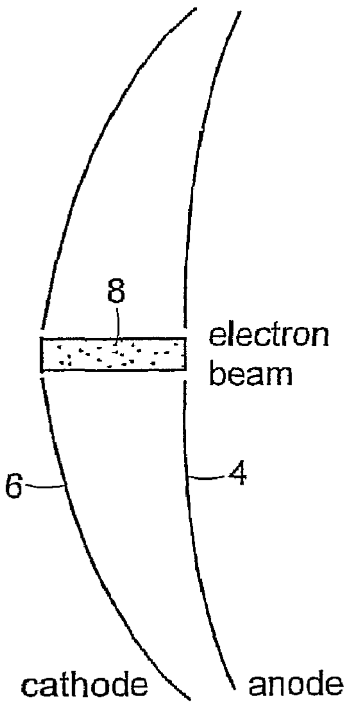

A non-axisymmetric diode 2 is shown schematically in FIGS. 1A-1C. FIG. 1A shows the non-axisymmetric diode 2 with a Child-Langmuir electron beam 8 with an elliptic cross-section having an anode 4 and cathode 6. FIG. 1B is a vertical cross-sectional view of the non-axisymmetric diode 2 and FIG. 1C is a horizontal cross-sectional view of the non-axisymmetric diode 2 showing an electron beam 8 and the cathode 6 and anode 4 electrodes.

The electron beam 8 has an elliptic cross section and the characteristics of Child-Langmuir flow. The particles are emitted from the cathode 6, and accelerated by the electric field between the cathode 6 and anode 4. For an ion beam, the roles of cathode and anode are reversed.

To describe the method of designing an non-axisymmetric diode with an elliptic cross-section, one can introduce the elliptic coordinate system (ξ,η,z; f), defined in terms of the usual Cartesian coordinates by $$x=f\cosh(\xi)\cos(\eta),\quad y=f\sinh(\xi)\sin(\eta),\quad z=z \tag{1.1}$$

where $\xi\epsilon[0,\infty)$ is a radial coordinate, $\eta\epsilon[0,2\pi)$ is an angular coordinate, and f is a constant scaling parameter. A charged-particle beam flowing in the $\hat{e}_z$ direction and taking the Child-Langmuir profile of parallel flow with uniform transverse density will possess an internal electrostatic potential of $$\Phi(\xi,\eta,z)=V\left(\frac{z}{d}\right)^{4/3}, \tag{1.2}$$

where one can have defined Φ(z=0)=0 along a planar charge-emitting surface and Φ(z=d)=V along a planar charge-accepting surface.

If both planes have transverse boundaries of elliptic shape, specified by the surface $\xi=\xi_0$=constant, then a solution exists for a parallel flow, uniform transverse density, Child-Langmuir charged-particle beam of elliptic cross-section, flowing between the planes at z=0 and z=d. Due to the mutual space-charge repulsion of the particles constituting the beam, this Child-Langmuir profile must be supported by the imposition of an external electric field through the construction of appropriately shaped electrodes. The design of said electrodes requires knowledge of the electrostatic potential function external to the beam which satisfies appropriate boundary conditions on the beam edge:

$$\Phi(\xi_0,\eta,z)=V\left(\frac{z}{d}\right)^{4/3},\qquad \left.\frac{\partial}{\partial\xi}\Phi(\xi,\eta,z)\right|_{\xi=\xi_0}=0. \tag{1.3}$$

As the potential and its normal derivative are specified independently on the surface $\xi=\xi_0$, this forms an elliptic Cauchy problem, for which standard analytic and numerical solution methods fail due to the exponential growth of errors which is characteristic of all elliptic Cauchy problems. The present technique builds on the 2-dimensional technique of Radley in order to formulate a method of solution for the full 3D problem of determining the electrostatic potential outside a Child-Langmuir charged-particle beam of elliptic cross-section.

In the region external to the beam, the potential satisfies Laplace's equation, which is written in elliptic coordinates as $$\begin{aligned}
0 &= \frac{1}{F(\xi,\eta,z)}\nabla^2 F(\xi,\eta,z)\\
&= \frac{1}{F(\xi,\eta,z)}\left[\frac{2}{f^2(\cosh 2\xi-\cos 2\eta)}\left(\frac{\partial^2}{\partial\xi^2}+\frac{\partial^2}{\partial\eta^2}\right)+\frac{\partial^2}{\partial z^2}\right]F(\xi,\eta,z)\\
&= \frac{1}{Z(z)T(\xi,\eta)}\left[\frac{2}{f^2(\cosh 2\xi-\cos 2\eta)}\left(\frac{\partial^2}{\partial\xi^2}+\frac{\partial^2}{\partial\eta^2}\right)+\frac{\partial^2}{\partial z^2}\right]Z(z)T(\xi,\eta)\\
&= \underbrace{\frac{1}{T(\xi,\eta)}\frac{2}{f^2(\cosh 2\xi-\cos 2\eta)}\left(\frac{\partial^2}{\partial\xi^2}+\frac{\partial^2}{\partial\eta^2}\right)T(\xi,\eta)}_{-k^2}+\underbrace{\frac{1}{Z(z)}\frac{\partial^2}{\partial z^2}Z(z)}_{k^2},
\end{aligned} \tag{1.4}$$

where one can follow the usual technique of separation of variables, writing F(ξ,η,z)=Z(z)T(ξ,η) and introducing the separation constant $k^2$. The separated equations can now be written as $$0=\left(\frac{\partial 2}{\partial z2}-k2\right)Z(z), \tag{1.5}$$

$$\begin{aligned}
0 &= \frac{1}{T(\xi,\eta)}\left(\frac{\partial^2}{\partial\xi^2}+\frac{\partial^2}{\partial\eta^2}\right)+k^2\frac{f^2}{2}(\cosh 2\xi-\cos 2\eta)\\
&= \underbrace{\frac{1}{R(\xi)}\frac{\partial^2}{\partial\xi^2}R(\xi)+\frac{k^2f^2}{2}\cosh 2\xi}_{a}+\underbrace{\frac{1}{\Theta(\eta)}\frac{\partial^2}{\partial\eta^2}\Theta(\eta)-\frac{k^2f^2}{2}\cos 2\eta}_{-a},
\end{aligned} \tag{1.6}$$

where one can have performed another separation on the transverse equation, writing $T(\xi,\eta)=R(\xi)\Theta(\eta)$ and introducing the separation constant a. This last equation thus yields $$0=\frac{\partial^2}{\partial\xi^2}R(\xi)-\left(a-\frac{k^2f^2}{2}\cosh 2\xi\right)R(\xi), \tag{1.7}$$

$$0=\frac{\partial^2}{\partial\eta^2}\Theta(\eta)+\left(a-\frac{k^2f^2}{2}\cos 2\eta\right)\Theta(\eta). \tag{1.8}$$

Solutions to the separated transverse equations are known as the Radial Mathieu Functions $R(\xi)$ and Angular Mathieu Functions $\Theta(\eta)$, respectively, while the solutions to the separated longitudinal equation are easily expressed in terms of exponentials $Z(z)\propto e^{\pm kz}$.

Figure 2:
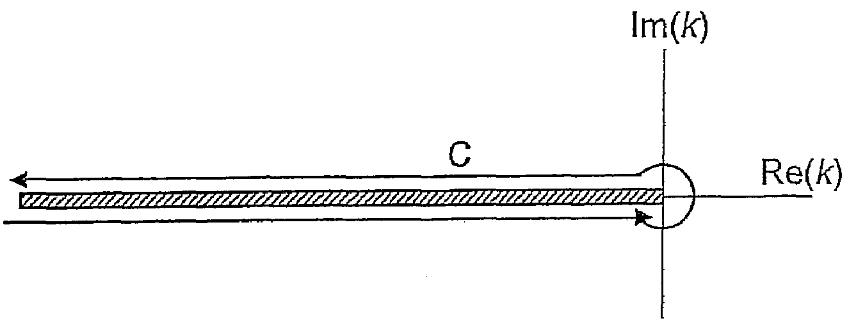
FIG. 2 is a graph demonstrating the Integration Contour C for the potential $\Phi$.

The solution for the potential is now represented as a superposition of separable solutions which, jointly, satisfy the boundary conditions on $\Phi$. One can write $$\Phi(\xi,\eta,z)=\int dk[A(k)e^{kz}\int B(a)R_a(\xi;k)\Theta_a(\eta;k)da] \tag{1.9}$$

where the amplitude functions A(k) and B(a) are introduced and the integration contours are as yet unspecified. In order to satisfy the boundary condition on $\Phi$ along the beam edge, using the analytic continuation of the Gamma function, one can write $$z^{4/3}=\frac{1}{\Gamma\left(-\frac{4}{3}\right)}\frac{i}{2\sin\left(\frac{4\pi}{3}\right)}\int_C e^{kz}k^{-7/3}\,dk, \tag{1.10}$$

where the integration contour C is taken around the branch cut as shown in FIG. 2.

One can then write the boundary condition as $$\begin{aligned}\Phi(\xi_0,\eta,z)&=V\left(\frac{z}{d}\right)^{4/3}\\&=\frac{Vd^{-4/3}}{\Gamma\left(-\frac{4}{3}\right)}\frac{i}{2\sin\left(\frac{4\pi}{3}\right)}\int_C e^{kz}k^{-7/3}\,dk\\&=\int dk\left[A(k)e^{kz}\int B(a)R_a(\xi_0;k)\Theta_a(\eta;k)\,da\right].\end{aligned} \tag{1.11}$$

The boundary condition is satisfied by choosing C as the integration contour for the representation of $\Phi$ and making the correspondences $$A(k)=\frac{Vd^{-4/3}}{\Gamma\left(-\frac{4}{3}\right)}\frac{i}{2\sin\left(\frac{4\pi}{3}\right)}k^{-7/3}, \tag{1.12}$$

and $$\int B(a)R_a(\xi_0;k)\Theta_a(\eta;k)\,da=1. \tag{1.13}$$

The physical system requires a solution periodic in $\eta$ and symmetric about $\eta=0$ and $\eta=\pi/2$. In general, the Angular Mathieu Functions $\Theta_a(\eta)$ are not periodic. Indeed, a periodic solution arises only for certain characteristic eigenvalues of the separation constant a. There are 4 infinite and discrete sets of eigenvalues denoted by $a_{2n}$, $a_{2n+1}$, $b_{2n}$, $b_{2n+1}$ for N $\epsilon\{0, 1, 2, \ldots\}$ which differ in their symmetry properties. Only the set $a_{2n}$ and the corresponding cosine-elliptic solutions denoted by $\Theta(\eta)=ce_{2n}(\eta;k)$ possess the appropriate symmetries, and the integral over a becomes a sum of the form $$1=\sum_{n=0}^{\infty}B_{2n}R_{a_{2n}}(\xi_0;k)ce_{2n}(\eta;k). \tag{1.14}$$

Moreover, the set of solutions $ce_{2n}$ is orthogonal and complete over the space of functions with the desired symmetry and periodicity properties. Thus one can expand unity as $$1=\sum_{n=0}^{\infty}ce_{2n}(\eta;k)\frac{\int_0^{2\pi}ce_{2n}(\eta;k)\,d\eta}{\int_0^{2\pi}|ce_{2n}(\eta;k)|^2\,d\eta}. \tag{1.15}$$

The boundary condition on $\Phi$ is then satisfied by choosing $$B_{2n}=\frac{\int_0^{2\pi}ce_{2n}(\eta;k)\,d\eta}{\int_0^{2\pi}|ce_{2n}(\eta;k)|^2\,d\eta}, \tag{1.16}$$

and $$R_{a_{2n}}(\xi_0;k)=1. \tag{1.17}$$

The condition that the normal derivative of the potential vanishes along the beam surface implies $$\frac{\partial}{\partial\xi}R_{a_{2n}}(\xi;k)\Big|_{\xi=\xi_0}=0, \tag{1.18}$$

which, along with the boundary value of $R_{a_{2n}}$ and the eigenvalue $a_{2n}$, fully specify the second-order Radial Mathieu Equation. It can then be integrated by standard methods in order to determine the radial solutions.

Thus, one may rewrite the expansion for $\Phi$ as $$\Phi(\xi,\eta,z)=\frac{Vd^{-4/3}}{\Gamma\left(-\frac{4}{3}\right)}\frac{i}{2\sin\left(\frac{4\pi}{3}\right)}\int_C dk\left[k^{-7/3}e^{kz}\left\{\sum_{n=0}^{\infty}ce_{2n}(\eta;k)R_{a_{2n}}(\xi;k)\frac{\int_0^{2\pi}ce_{2n}(\eta;k)\,d\eta}{\int_0^{2\pi}|ce_{2n}(\eta;k)|^2\,d\eta}\right\}\right]. \tag{1.19}$$

A number of methods may be used to evaluate the characteristic values $a_{2n}$ and the corresponding Angular Mathieu Functions $ce_{2n}$. These can be integrated by standard methods. In practice, only the first few terms of the infinite series need be retained in order to reduce fractional errors to below $10^{-5}$. The integral along the contour C can be transformed into definite integrals of complex-valued functions along the real line, and thus it, too, can be evaluated using standard methods.

Figure 3:
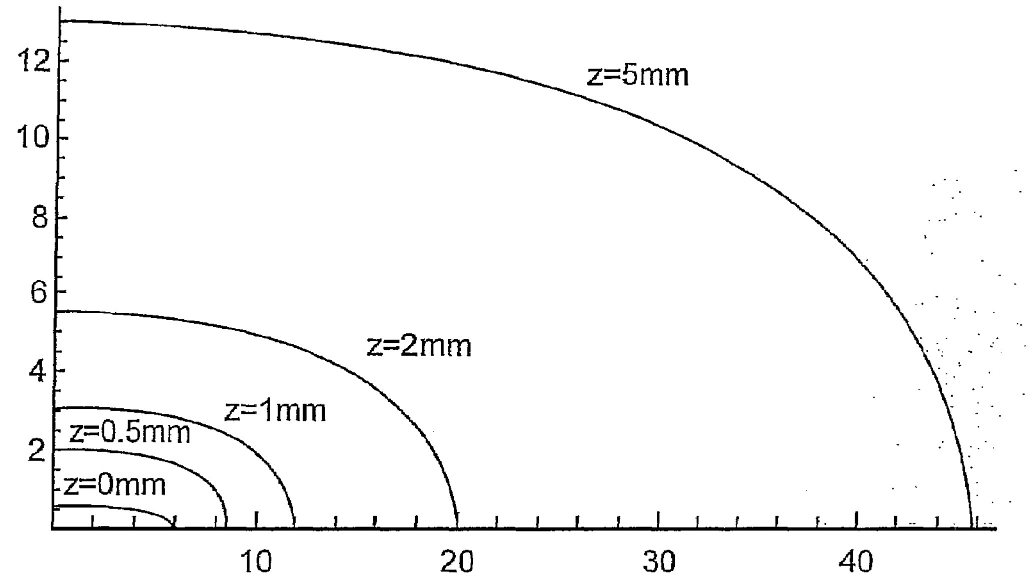
FIG. 3 is a graph demonstrating the cross-section of the $\Phi=0$ electrode at various positions along the beam axis.
Figure 4:
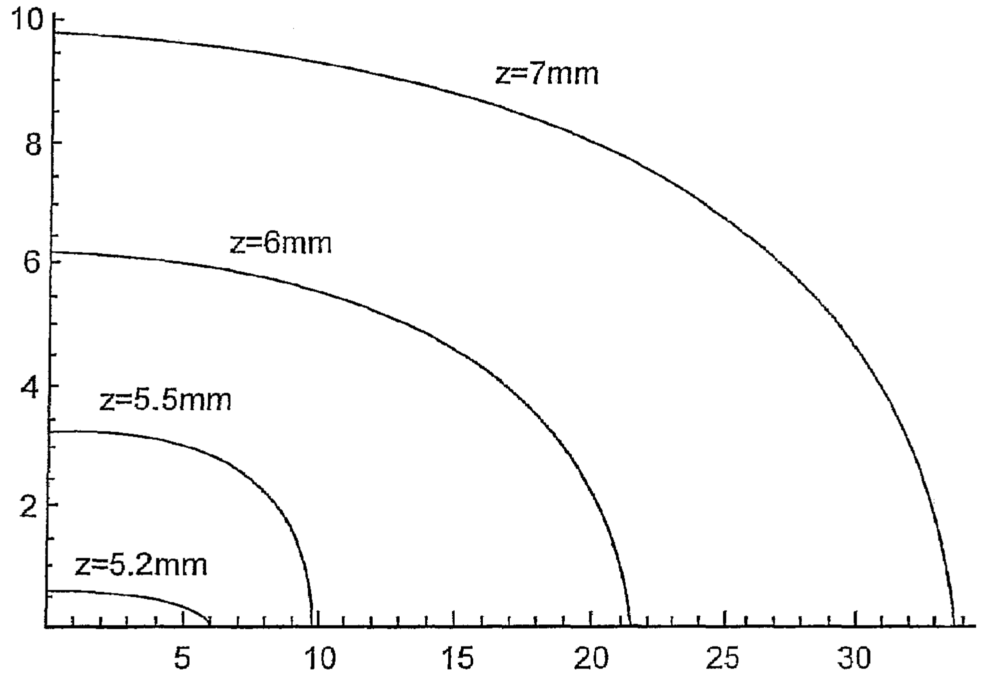
FIG. 4 is a graph demonstrating the cross-section of the $\Phi=V$ electrode at various positions along the beam axis.

Once the potential profile is known, one can employ a root-finding technique in order to determine surfaces along which one may place constant-potential electrodes. A numerical module has been developed which determines these electrode shapes based on the theory described and solution methods described above. Sample electrode designs are shown in FIGS. 3 and 4 for the case of a 10:1 elliptical beam of semi-major radius 6 mm and semi-minor radius 0.6 mm. These electrodes serve to enforce the analytically-derived potential profile along the beam edge, which in turn serves to confine the beam and maintain it in the Child-Langmuir form.

Figure 5:
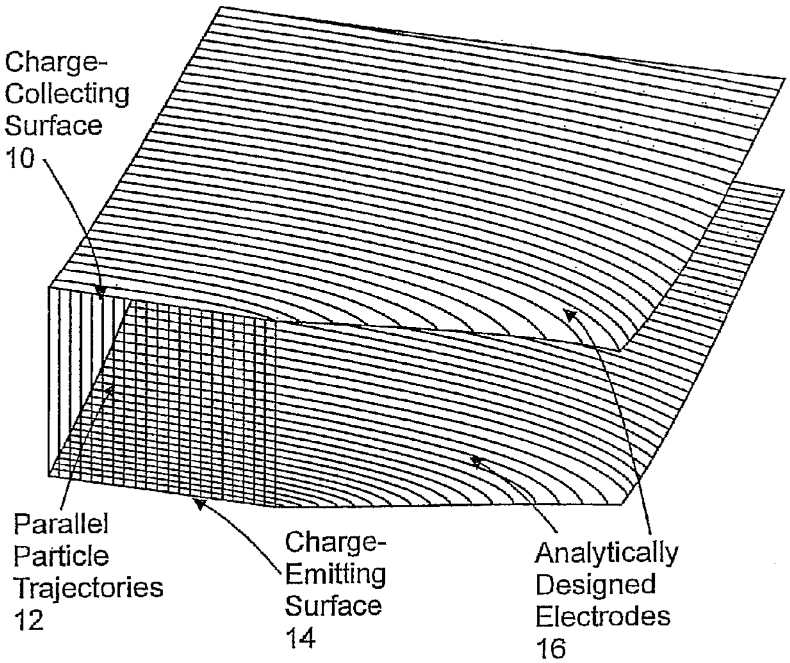
FIG. 5 is a schematic diagram demonstrating the electrode geometry of a well-confined, parallel beam of elliptic cross section.

The 3-dimensional charged-particle optics tool Omni-Trak has been used to simulate the emission and transport of charge particles in the geometry of FIGS. 3 and 4. The resulting particle trajectories, shown in FIG. 5, are indeed parallel, as predicted by the theory. The results of the Omni-Trak simulation also provide a validation of the analytical method presented above.

One will often wish to extract this beam and inject it into another device by excising a portion of the charge-collecting plate. Doing so will modify the boundary conditions of the problem such that the above solution can no longer be considered exact, however, the errors introduced by relatively small excisions will be negligible, and the appropriate electrode shapes will be substantially unchanged from those produced by the method outlined above.

It should also be noted that additional electrodes, intermediate in potential between the cathode and anode, may be added in order to aid the enforcement of the Child-Langmuir flow condition. The above prescription allows for their design. As with the charge-collecting plate, neither the cathode electrode nor the intermediate electrodes need be extended arbitrarily close to the beam edge in order to enforce the Child-Langmuir flow condition. The portion of these electrodes nearest the beam may be excised without substantially affecting the beam solution.

Along similar lines, in a physical device, one cannot extend the electrodes infinitely far in the transverse directions. The analytically-prescribed electrodes correspond to the surfaces of conductors separated by vacuum and/or other insulating materials and (in some region distant from the beam) deviating from the analytically-prescribed profiles. Nevertheless, as the influence of distant portions of the electrodes diminish exponentially with distance from the beam edge, these deviations will have a negligible effect on the beam profile, provided that they occur at a sufficient distance from the beam edge.

FIG. 5 depicts an Omni-Trak simulation in which the finiteness of the electrodes is evident without affecting the parallel-flow of the charged particle beam. Note FIG. 5 illustrates the charge collection surface 10, charge emitting surface 14, parallel particle trajectories 12, and analytically designed electrodes 16. By equating the electrode geometry with equipotential surfaces, the analytic method of electrode design detailed herein specifies the precise geometry of the charge-emitting 14 and charge-collecting 10 surfaces as well as the precise geometry of external conductors 16. These external conductors may be held at any potential, however, generally, two external conductors are used—one held at the emitter potential and the other at the collector potential. A charged-particle system designed conformally to this geometry will generate a high-quality, laminar, parallel-flow, Child-Langmuir beam of elliptic cross-section as shown in FIG. 5.

Figure 6:
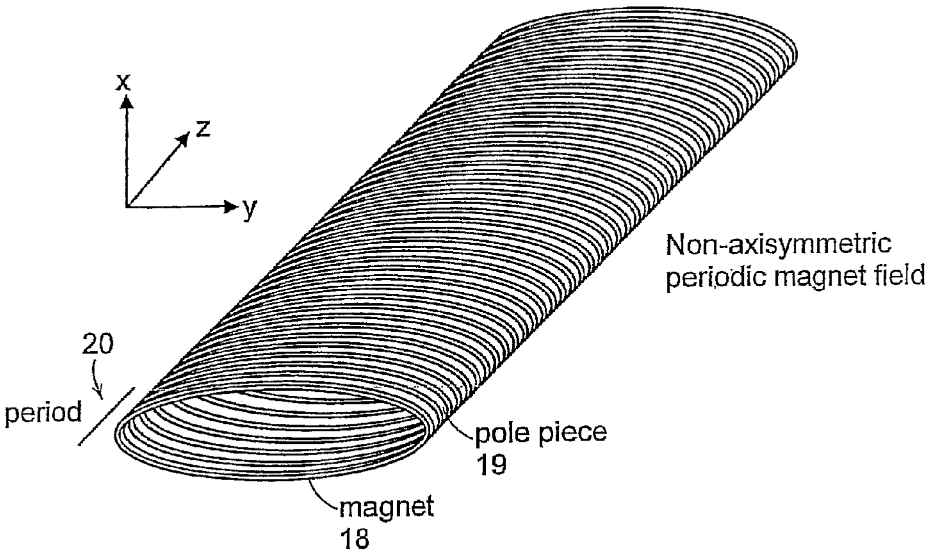
FIG. 6 is a schematic diagram of a non-axisymmetric periodic magnetic field.
Figure 7:
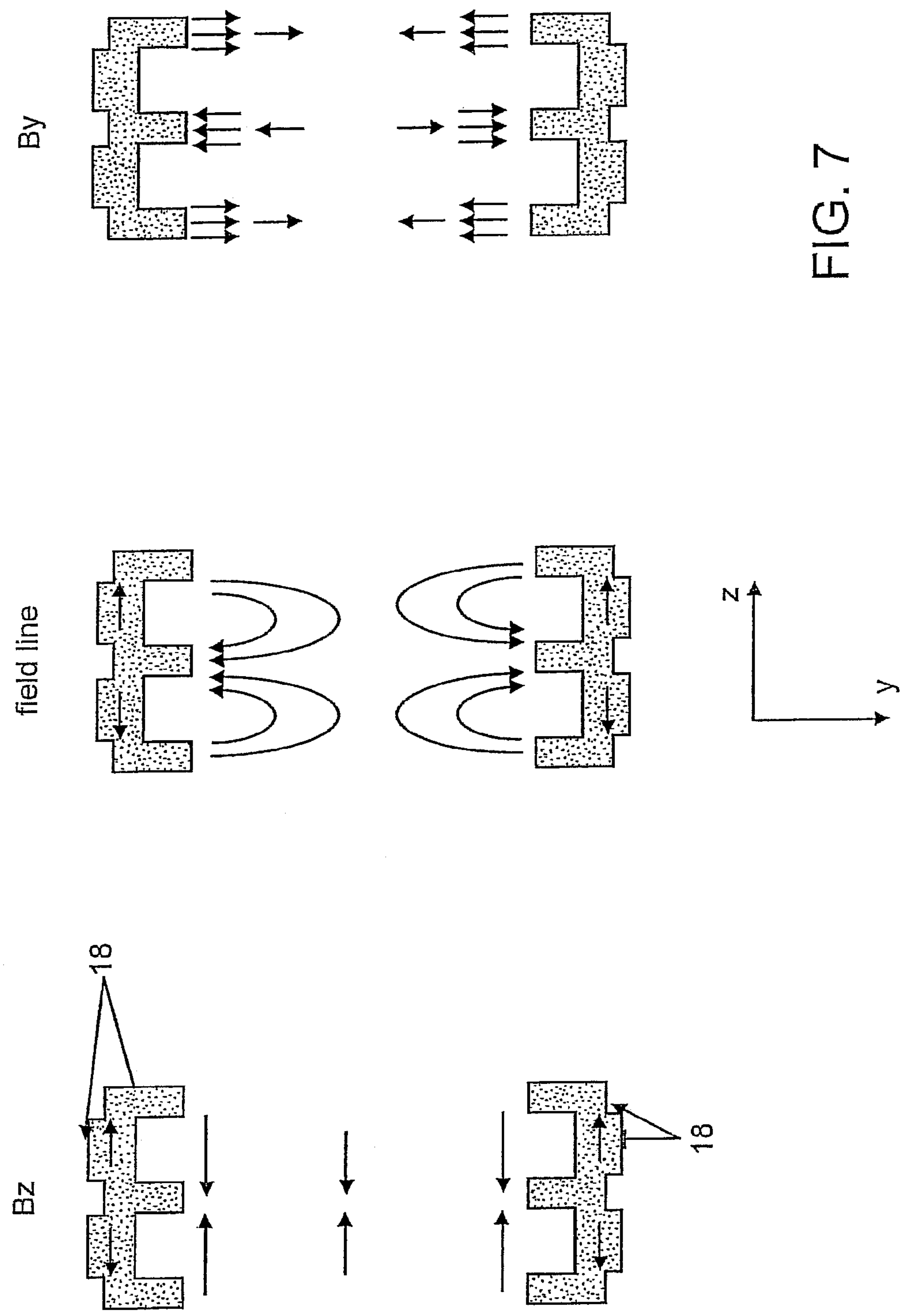
FIG. 7 is a schematic diagram of the field distribution of a non-axisymmetric periodic magnetic field.

As an illustrated example, a non-axisymmetric periodic magnetic field for focusing and transporting a non-axisymmetric beam is shown FIG. 6. FIG. 6 shows the iron pole pieces 18 and magnets 19 used to form the periodic magnetic field. The iron pole pieces are optional and may be omitted in other embodiments. The period of the magnetic field is defined by the line 20. The field distribution is illustrated FIG. 7. Note FIG. 7 illustrates the field lines form by the iron pole pieces 18 and magnets 19 of FIG. 6.

For a high-brightness, space-charge-dominated beam, kinetic (emittance) effects are negligibly small, and the beam can be adequately described by cold-fluid equations. In the paraxial approximation, the steady-state cold-fluid equations for time-stationary flow ($\partial/\partial t=0$) in cgs units are:

$$\beta_b c\frac{\partial}{\partial s}n_b + \nabla_\perp \cdot (n_b V_\perp) = 0, \tag{2.1}$$

$$\nabla_\perp^2 \phi^s = \beta_b^{-1}\nabla_\perp^2 A_z^s = -4\pi q n_b, \tag{2.2}$$

$$n_b\left(\beta_b c\frac{\partial}{\partial s} + V_\perp \cdot \frac{\partial}{\partial X_\perp}\right)V_\perp = \frac{qn_b}{\gamma_b m}\left[-\frac{1}{\gamma_b^2}\nabla_\perp\phi^s + \beta_b\hat{e}_2 \times B_\perp^{ext} + \frac{V_\perp}{c}\times B_z^{ext}(s)\hat{e}_z\right], \tag{2.3}$$

where s=z, q and m are the particle charge and rest mass, respectively, $$\gamma_b = \frac{1}{\sqrt{1-\beta_b^2}}$$

is the relativistic mass factor, use has been made of $\beta_z \cong \beta_b$=const, and the self-electric field $E^s$ and self-magnetic field $B^s$ are determined from the scalar potential $\phi^s$ and vector potential $A_z^s\hat{e}_z$, i.e., $E^s=-\nabla_\perp\phi^s$ and $B^s=\nabla\times A_z^s\hat{e}_z$.

One seeks solutions to Eqs. (2.1)-(2.3) of the form $$n_b(x_\perp, s) = \frac{N_b}{\pi a(s)b(s)}\Theta\left[1-\frac{\tilde{x}^2}{a^2(s)}-\frac{\tilde{y}^2}{b^2(s)}\right], \tag{2.4}$$

$$V_\perp(x_\perp, s) = [\mu_x(s)\tilde{x} - a_x(s)\tilde{y}]\beta_b c\hat{e}_{\tilde{x}} + \lfloor\mu_y(s)\tilde{y} + \alpha_y(s)\tilde{x}\rfloor\beta_b c\hat{e}_{\tilde{y}}. \tag{2.5}$$

Figure 8:
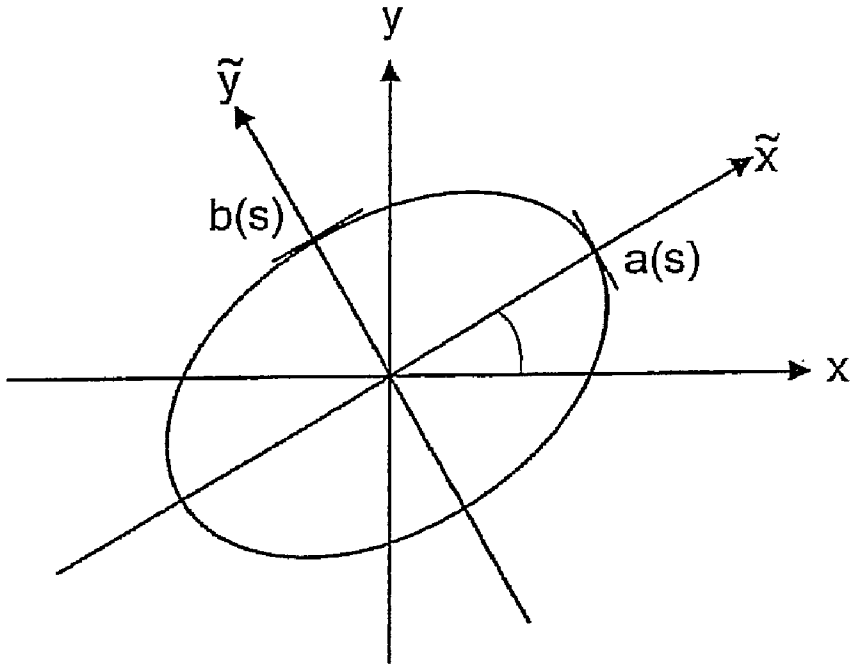
FIG. 8 is a schematic diagram demonstrating the laboratory and rotating coordinate systems.

In Eqs. (2.4) and (2.5), $x_\nabla=\tilde{x}\hat{e}_{\tilde{x}}+\tilde{y}\hat{e}_{\tilde{y}}$ is a transverse displacement in a rotating frame illustrated in FIG. 8; θ(s) is the angle of rotation of the ellipse with respect to the laboratory frame; Θ(x)=1 if x>0 and Θ(x)=0 if x<0; and the functions a(s), b(s), $\mu_x(s)$, $\mu_y(s)$, $\alpha_x(s)$, $\alpha_y(s)$ and θ(s) are to be determined self-consistently [see Eqs. (2.11)-(2.15)].

For the self-electric and self-magnetic fields, Eqs. (2.2) and (2.4) are solved to obtain the scalar and vector potentials $$\phi^s = \beta_b^{-1}A_z^s = -\frac{2qN_b}{a+b}\left(\frac{\tilde{x}^2}{a}+\frac{\tilde{y}^2}{b}\right). \tag{2.6}$$

For a 3D non-axisymmetric periodic magnetic field with an axial periodicity length of S, one can describe it as the fundamental mode, $$B^{ext}(x) = B_0\left[\frac{k_{0x}}{k_0}\sinh(k_{0x}x)\cosh(k_{0y}y)\cos(k_0s)\hat{e}_x + \frac{k_{0y}}{k_0}\cosh(k_{0x}x)\sinh(k_{0y}y)\cos(k_0s)\hat{e}_y - \cosh(k_{0x}x)\cosh(k_{0y}y)\sin(k_0s)\hat{e}_z\right], \quad (2.7)$$

and further expand it to the lowest order in the transverse dimension to obtain $$\begin{aligned} B^{ext}(x) \approx\ & B_0\left[\frac{k_{0x}^2}{k_0}\cos(k_0s)x\hat{e}_x + \frac{k_{0y}^2}{k_0}\cos(k_0s)y\hat{e}_y - \sin(k_0s)\hat{e}_z\right] \\ =\ & B_0\left[\cos(k_0s)\left(\frac{k_{0x}^2\cos^2\theta + k_{0y}^2\sin^2\theta}{k_0}\tilde{x} - \frac{k_{0x}^2 - k_{0y}^2}{2k_0}\sin(2\theta)\tilde{y}\right)\hat{e}_{\tilde{x}} + \cos(k_0s)\left(-\frac{k_{0x}^2 - k_{0y}^2}{2k_0}\sin(2\theta)\tilde{x} + \frac{k_{0x}^2\sin^2\theta + k_{0y}^2\cos^2\theta}{k_0}\tilde{y}\right)\hat{e}_{\tilde{y}} - \sin(k_0s)\hat{e}_z\right]. \end{aligned} \quad (2.8)$$

In Eqs. (2.7) and (2.8), $$k_0 = \frac{2\pi}{S}, \quad (2.9)$$

$$k_{0x}^2 + k_{0y}^2 = k_0^2. \quad (2.10)$$

The 3D magnetic field is specified by the three parameters $B_0$, S and $k_{0x}/k_{0y}$.

Using the expressions in Eqs. (2.5), (2.6) and (2.8), it can be shown that both the equilibrium continuity and force equations (2.1) and (2.3) are satisfied if the dynamical variables a(s), b(s), $\mu_x(s) \equiv a^{-1}da/ds$, $\mu_y(s) \equiv b^{-1}db/ds$, $\alpha_x(s)$, $\alpha_y(s)$ and θ(s) obey the generalized beam envelope equations:

$$\frac{d^2a}{ds^2} + \left[-\frac{b^2(\alpha_x^2 - 2\alpha_x\alpha_y) + a^2\alpha_y^2}{a^2 - b^2} + \sqrt{\kappa_z}\frac{k_{0x}^2 - k_{0y}^2}{k_0}\cos(k_0s)\sin(2\theta) - 2\sqrt{\kappa_z}\alpha_y\sin(k_0s)\right]a - \frac{2K}{a+b} = 0, \quad (2.11)$$

$$\frac{d^2b}{ds^2} + \left[\frac{a^2(\alpha_y^2 - 2\alpha_x\alpha_y) + b^2\alpha_x^2}{a^2 - b^2} + \sqrt{\kappa_z}\frac{k_{0x}^2 - k_{0y}^2}{k_0}\cos(k_0s)\sin(2\theta) + 2\sqrt{\kappa_z}\alpha_x\sin(k_0s)\right]b - \frac{2K}{a+b} = 0, \quad (2.12)$$

$$\frac{d}{ds}(a^2\alpha_y) - \frac{ab^3(\alpha_x - \alpha_y)}{a^2 - b^2}\frac{d}{ds}\left(\frac{a}{b}\right) - 2\sqrt{\kappa_z}\cos(k_0s)\frac{k_{0x}^2\cos^2\theta + k_{0y}^2\sin^2\theta}{k_0}a^2 - 2\sqrt{\kappa_z}a\frac{da}{ds}\sin(k_0s)a = 0, \quad (2.13)$$

-continued $$\frac{d}{ds}(b^2\alpha_x) - \frac{a^3b(\alpha_x - \alpha_y)}{a^2 - b^2}\frac{d}{ds}\left(\frac{b}{a}\right) - 2\sqrt{\kappa_z}\cos(k_0s)\frac{k_{0x}^2\sin^2\theta + k_{0y}^2\cos^2\theta}{k_0}b^2 - 2\sqrt{\kappa_z}b\frac{db}{ds}\sin(k_0s) = 0, \quad (2.14)$$

$$\frac{d\theta}{ds} = \frac{a^2\alpha_y - b^2\alpha_x}{a^2 - b^2}, \text{ where} \quad (2.15)$$

$$\sqrt{\kappa_z} \equiv \frac{qB_0}{2\gamma_b\beta_b mc^2} \text{ and } K \equiv \frac{2q^2N_b}{\gamma_b^3\beta_b^2 mc^2}. \quad (2.16)$$

Equations (2.11)-(2.15) have the time reversal symmetry under the transformations $(s,a,b,a',b',\alpha_x,\alpha_y,\theta) \rightarrow (-s,a,b,-a',-b',-\alpha_x,-\alpha_y,\theta)$. This implies that the dynamical system described by Eqs. (2.11)-(2.15) has the hyper symmetry plane $(a',b',\alpha_x,\alpha_y)$.

A numerical module was developed to solve the generalized envelope equations (2.11)-(2.15). There are, in total, seven functions a(s), b(s), a'(s), b'(s), $\alpha_x(s)$, $\alpha_x(s)$ and θ(s) to be solved. The time inverse symmetry of the dynamical system requires the quantities $(a',b',\alpha_x,\alpha_y)$ vanish at s=0 for matched solutions, therefore, only the three initial values a(0), b(0) and θ(0) corresponding to a matched solution need to be determined by using Newton's method. The matched solutions of the generalized envelope equations are shown in FIGS. 9A-9E for a non-axisymmetric beam system with the choice of system parameters corresponding to: $k_{0x}$=3.22 $cm^{-1}$, $k_{0y}$=5.39 $cm^{-1}$, $\sqrt{\kappa}$=0.805 $cm^{-1}$, K=1.53×$10^{-2}$ and axial periodicity length S=0.956 cm.

Figure 9A:
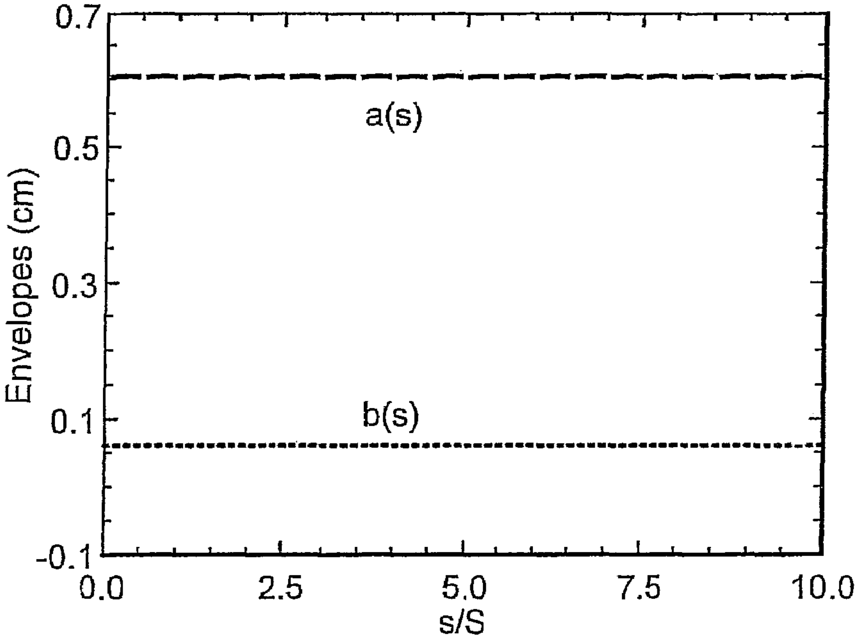
FIGS. 9A-9E are graphs demonstrating matched solutions of the generalized envelope equations for a non-axisymmetric beam system with parameters corresponding to: $k_{0x}=3.22$ $cm^{-1}$, $k_{0y}=5.39$ $cm^{-1}$, $\sqrt{\kappa_z}=0.805$ $cm^{-1}$, $K=1.53\times10^{-2}$ and axial periodicity length S=0.956 cm.
Figure 9B:
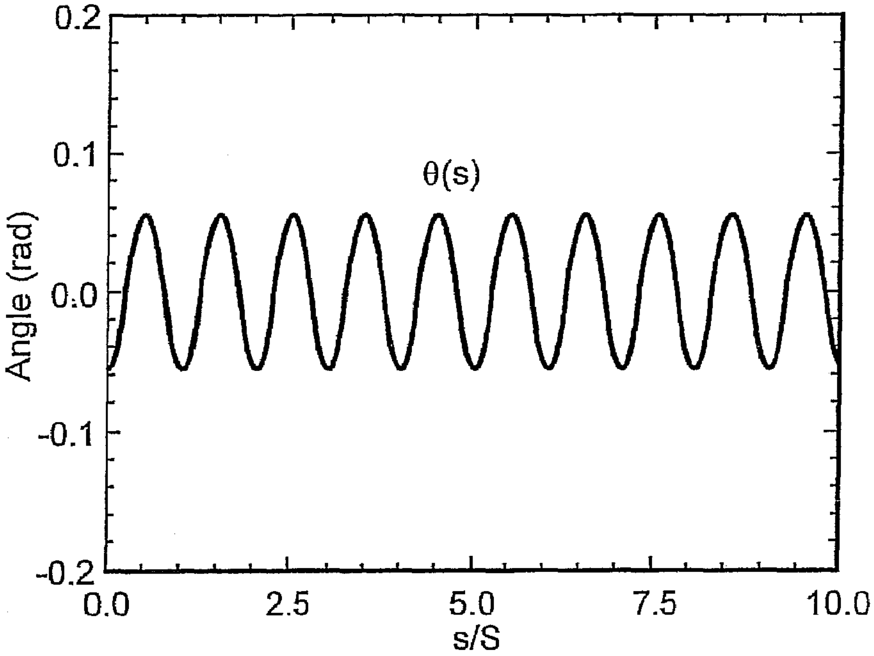
Figure 9C:
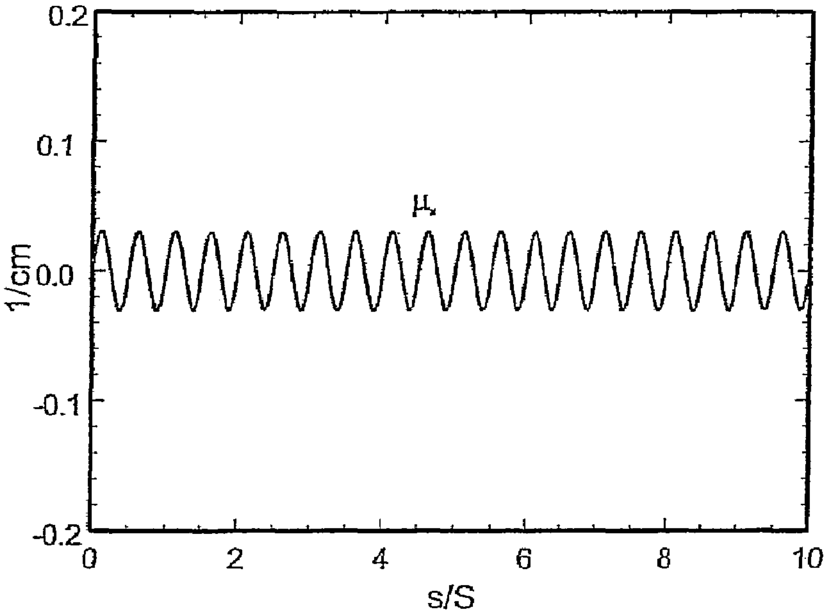

In particular, FIG. 9A demonstrates the envelopes associated with the functions a(s) and b(s). FIG. 9B is graphical representation of rotating angle θ(s). FIG. 9C is a graph illustrating velocity $$\mu_x(s) = \frac{1}{a}\frac{da}{ds}.$$

Figure 9D:
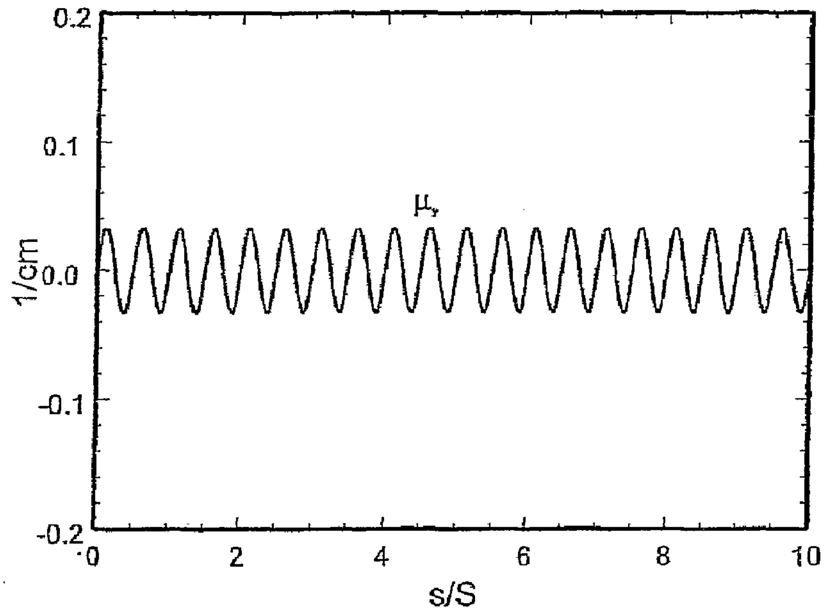

FIG. 9D is a graph demonstrating velocity $$\mu_y(s) = \frac{1}{b}\frac{db}{ds}.$$

Figure 9E:
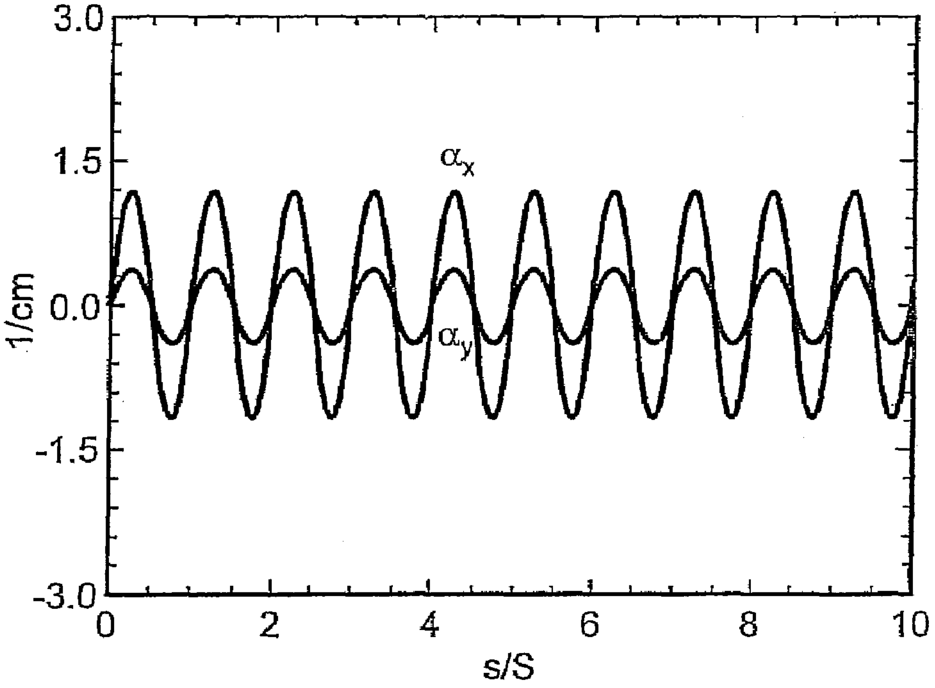

FIG. 9E is a graph demonstrating velocities $\alpha_x(s)$ and $\alpha_y(s)$ versus the axial distance s for a flat, ellipse-shaped, uniform-density charged-particle beam in a 3D non-axisymmetric magnetic field.

The matching from the charged-particle diode to the focusing channel might not be perfect in experiments. If a mismatch is unstable, it might ruin the beam. However, investigations of small-mismatch beams show that the envelopes are stable against small mismatch.

For example, the envelopes and flow velocities are plotted in FIGS. 10A-10E for a non-axisymmetric beam system with the choice of system parameters corresponding to: $k_{0x}$=3.22 $cm^{-1}$, $k_{0y}$=5.39 $cm^{-1}$, $\sqrt{\kappa_z}$=0.805 $cm^{-1}$, K=1.53 ×$10^{-2}$ and axial periodicity length S=0.956 cm with an initial 5% mismatch of θ, i.e. $\theta(s=0)=\theta_{matched}(s=0)\times(1.05)$.

Figure 10A:
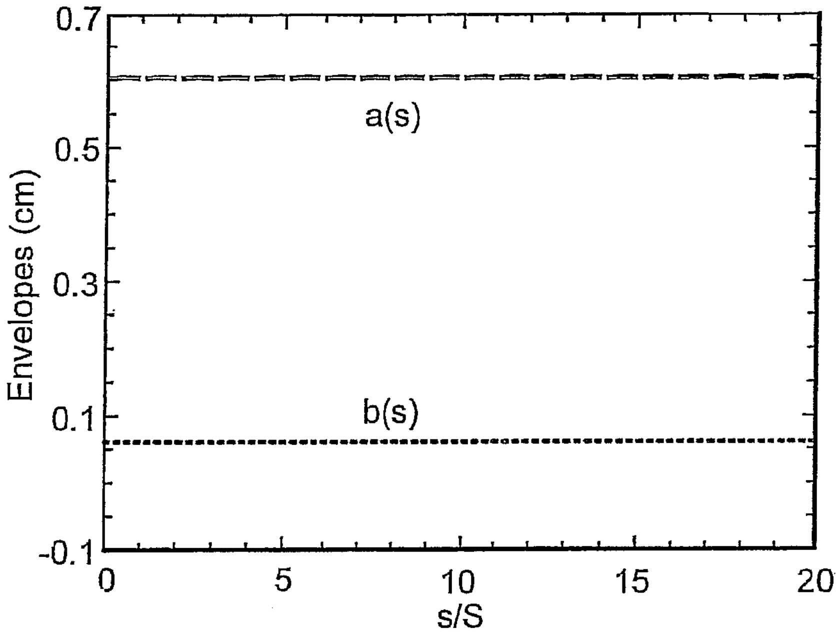
FIGS. 10A-10E are graphs demonstrating the envelopes and flow velocities for a non-axisymmetric beam system with the choice of system parameters corresponding to: $k_{0x}$=3.22 $cm^{-1}$, $k_{0y}$=5.39 $cm^{-1}$, $\sqrt{\kappa_z}$=0.805 $cm^{-1}$, K=1.53×$10^{-2}$, axial periodicity length S=0.956 cm, and a slight mismatch.
Figure 10B:
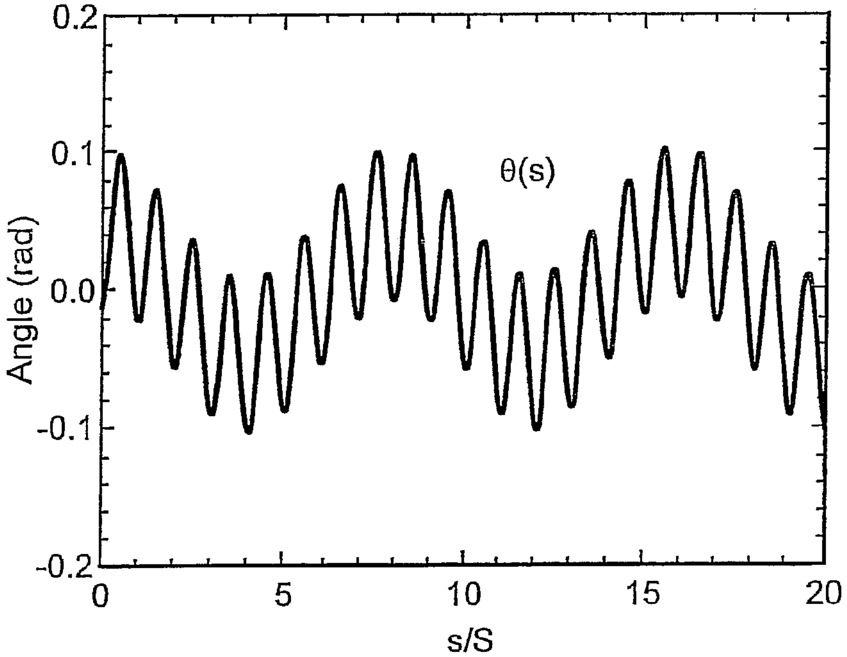
Figure 10C:
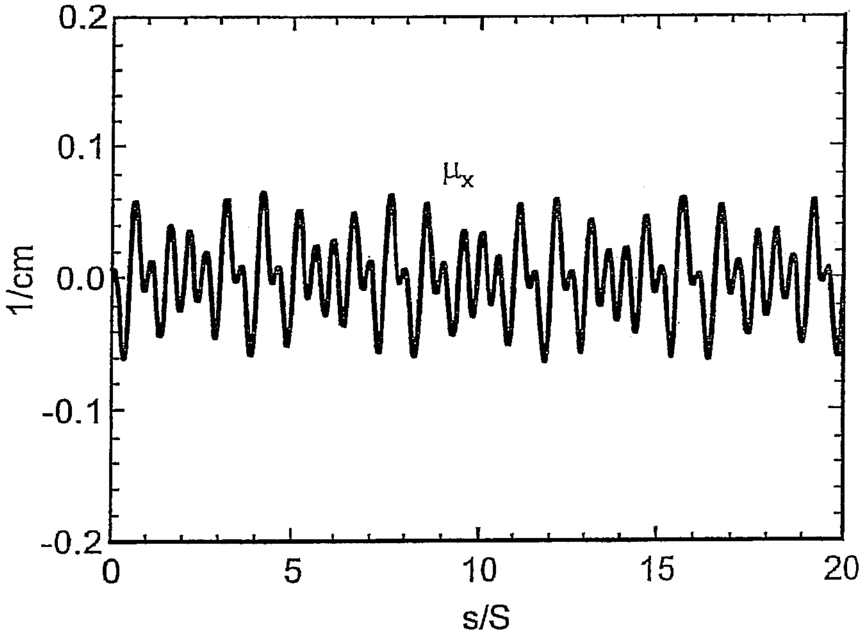

In particular, FIG. 10A demonstrates the envelopes associated with the functions a(s) and b(s). FIG. 10B is graphical representation of rotating angle θ(s). FIG. 10C is a graph illustrating velocity $$\mu_x(s) = \frac{1}{a}\frac{da}{ds}.$$

Figure 10D:
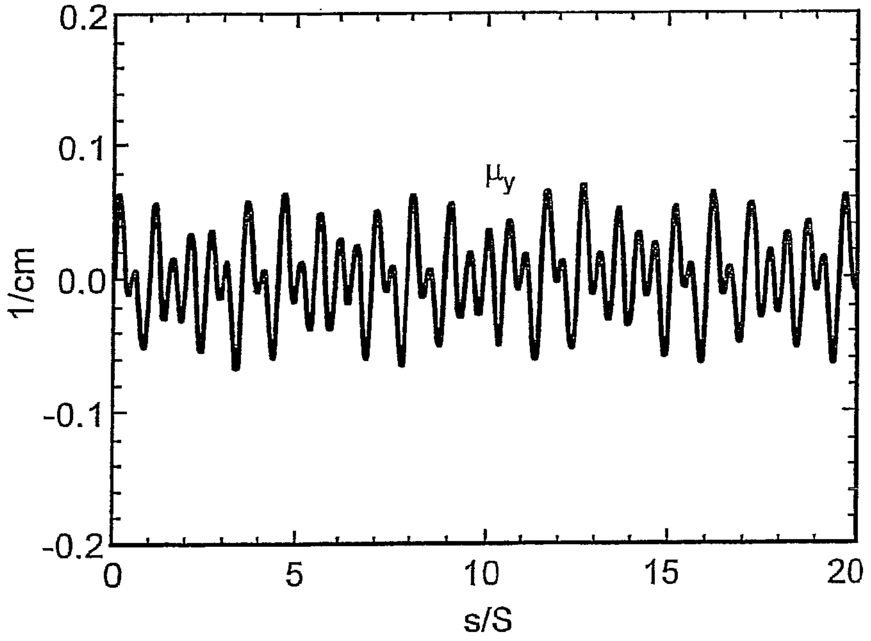

FIG. 10D is a graph demonstrating velocity $$\mu_y(s) = \frac{1}{b}\frac{db}{ds}.$$

Figure 10E:
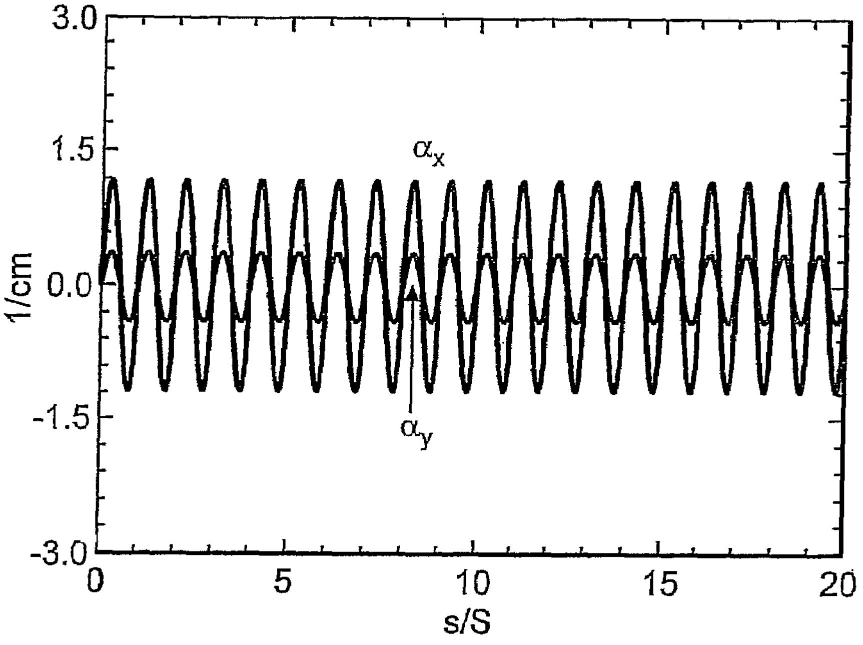

FIG. 10E is a graph demonstrating velocities $\alpha_x(s)$ and $\alpha_y(s)$ versus the axial distance s for a flat, ellipse-shaped, uniform-density charged-particle beam in a 3D non-axisymmetric magnetic field.

By the technique described herein, one can design a non-axisymmetric magnetic focusing channel which preserves a uniform-density, laminar charged-particle beam of elliptic cross-section.

One can illustrate how to match an elliptic charged-particle beam from the non-axisymmetric diode, described herein, into a periodic quadrupole magnetic field. In the paraxial approximation, the periodic quadrupole magnetic field is described by $$B^{ext} = \left(\frac{\partial B_x^q}{\partial y}\right)_0 (y\hat{e}_x + x\hat{e}_y). \tag{3.1}$$

Figure 11:
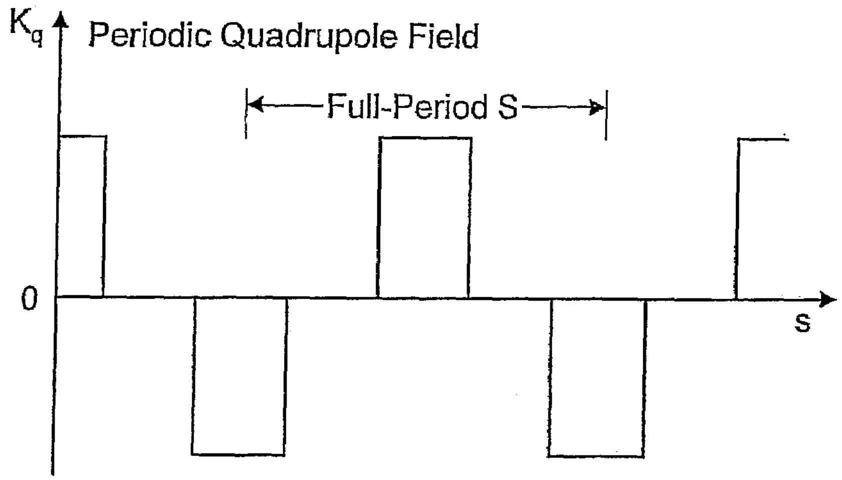
FIG. 11 is a graph demonstrating the focusing parameter for a periodic quadrupole magnetic field.
Figure 12:
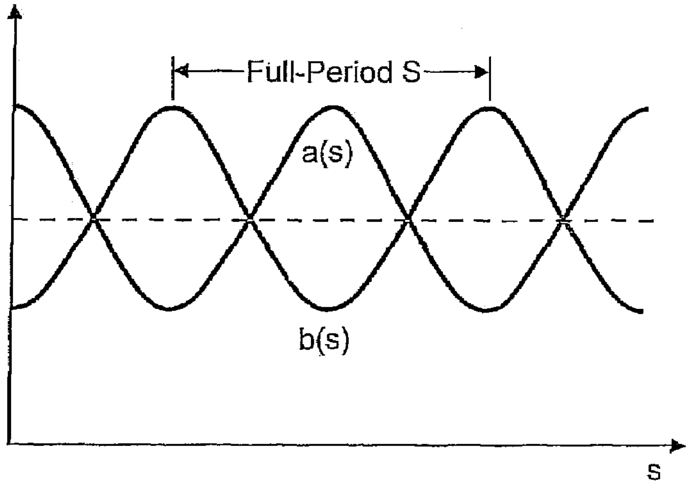
FIG. 12 is a graph demonstrating the beam envelopes of a pulsating elliptic beam equilibrium state in the periodic quadrupole magnetic field shown in FIG. 11.

The concept of matching is illustrated in FIGS. 11 and 12.

FIG. 11 shows an example of the magnetic focusing parameter $$k_q(s) = \frac{q}{\gamma_b \beta_b mc^2}\left(\frac{\partial B_x^q}{\partial y}\right)_0 \tag{3.2}$$

associated with the periodic quadrupole magnetic field for a beam of charged particles with charge q, rest mass m, and axial momentum $\gamma_b\beta_b$mc.

FIG. 12 shows the envelopes for pulsating elliptic beam equilibrium in the periodic quadrupole magnetic field, as described previously.

The matching of the equilibrium state from the diode to the equilibrium state for the periodic quadrupole magnetic field at s=0 is feasible, because the transverse density profile and flow velocity of the two equilibrium states are identical at s=0. In particular, the transverse particle density is uniform within the beam ellipse and the transverse flow velocity vanishes at s=0.

Also, one can illustrate how to match an elliptic charged-particle beam from the non-axisymmetric diode, as described herein, into a non-axisymmetric periodic permanent magnetic field. In the paraxial approximation, the non-axisymmetric permanent magnetic field is described by Eq. (2.8). The concept of matching is illustrated in FIGS. 13 and 14.

Figure 13:
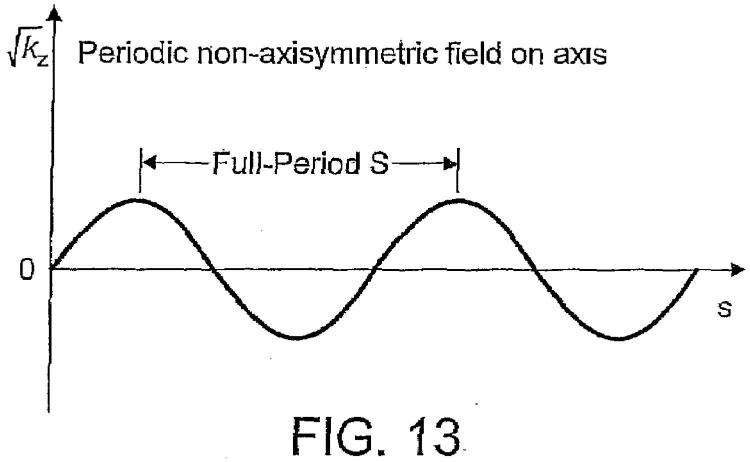
FIG. 13 is a graph demonstrating the focusing parameter for a non-axisymmetric periodic permanent magnetic field.

FIG. 13 shows an example of the magnetic focusing parameter $$\sqrt{\kappa_z(s)} \equiv \frac{qB_z(s)}{2\gamma_b\beta_b mc^2} \tag{4.1}$$

associated with the non-axisymmetric periodic permanent magnetic field (presented for a beam of charged particles with charge q, rest mass m, and axial momentum $\gamma_b\beta_b$mc.

Figure 14:
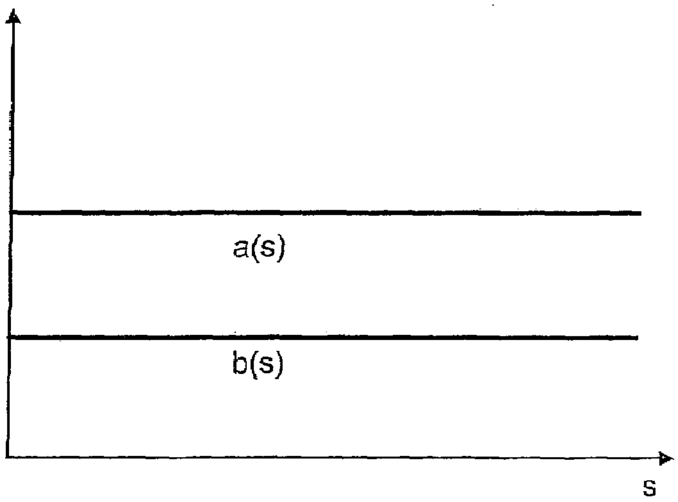
FIG. 14 is a graph demonstrating the beam envelopes of an elliptic beam equilibrium state in the non-axisymmetric periodic permanent magnetic field shown in FIG. 13.

FIG. 14 shows the envelopes for a flat, elliptic beam equilibrium state in the non-axisymmetric periodic permanent magnetic field. The angle of the ellipse exhibits slight oscillations. However, these oscillations can be corrected by utilizing higher longitudinal harmonics of the magnetic field profile.

The matching of the equilibrium state from the diode to the equilibrium state for the non-axisymmetric periodic permanent magnetic field at s=0 is feasible, because the transverse density profile and flow velocity of the two equilibrium states are identical. In particular, the transverse particle density is uniform within the beam ellipse and the transverse flow velocity vanishes at s=0.

The matching procedure discussed herein illustrates a high quality interface between a non-axisymmetric diode and a non-axisymmetric magnetic focusing channel for charged-particle beam.

This beam system will find application in vacuum electron devices and particle accelerators where high brightness, low emittance, low temperature beams are desired.

Although the present invention has been shown and described with respect to several preferred embodiments thereof, various changes, omissions and additions to the form and detail thereof, may be made therein, without departing from the spirit and scope of the invention.

What is claimed is:

1. A charged-particle beam system comprising a non-axisymmetric diode that forms a non-axisymmetric beam having an elliptic cross-section; and a focusing channel that utilizes a magnetic field for focusing and transporting said elliptic cross-section beam.

2. The charged-particle beam system of claim of 1, wherein said charged-particle beam possesses a uniform transverse density.

3. The charged-particle beam system of claim of 1, wherein said charged-particle beam possesses a laminar flow.

4. The charged-particle beam system of claim of 1, wherein said charged-particle beam possesses a parallel longitudinal flow.

5. The charged-particle beam system of claim 1, wherein said focusing channel comprises a non-axisymmetric magnetic field for focusing and transporting said charged-particle beam.

6. The charged-particle beam system of claim 5, wherein said non-axisymmetric magnetic field includes a non-axisymmetric periodic magnetic field.

7. The charged-particle beam system of claim 5, wherein said non-axisymmetric magnetic field includes a non-axisymmetric permanent magnetic field.

8. The charged-particle beam system of claim 5, wherein said non-axisymmetric magnetic field includes a non-axisymmetric periodic permanent magnetic field.

9. The charged-particle beam system of claim of 5, wherein said non-axisymmetric magnetic field includes at least one quadrupole magnetic field.

10. The charged-particle beam system of claim of 5, wherein said non-axisymmetric magnetic field includes a periodic quadrupole magnetic field.

11. The charged-particle beam system of claim 2, wherein said focusing channel comprises a non-axisymmetric magnetic field for focusing and transporting said charged-particle beam.

12. The charged-particle beam system of claim 11, wherein said non-axisymmetric magnetic field includes a non-axisymmetric periodic magnetic field.

13. The charged-particle beam system of claim 11, wherein said non-axisymmetric magnetic field includes a non-axisymmetric permanent magnetic field.

14. The charged-particle beam system of claim 11, wherein said non-axisymmetric magnetic field includes a non-axisymmetric periodic permanent magnetic field.

15. The charged-particle beam system of claim of 11, wherein said non-axisymmetric magnetic field includes at least one quadrupole magnetic field.

16. The charged-particle beam system of claim of 11, wherein said non-axisymmetric magnetic field includes a periodic quadrupole magnetic field.

17. A method of forming a charged-particle beam system comprising forming a non-axisymmetric diode that includes a non-axisymmetric beam having an elliptic cross-section; and forming a focusing channel that utilizes a magnetic field for focusing and transporting said elliptic cross-section beam.

18. The method of claim 17, wherein said charged-particle beam possesses a uniform transverse density.

19. The method of claim 17, wherein said charged-particle beam possesses a laminar flow.

20. The method of claim 17, wherein said charged-particle beam possesses a parallel longitudinal flow.

21. The method of claim 17, wherein said focusing channel comprises a non-axisymmetric magnetic field for focusing and transporting said charged-particle beam.

22. The method of claim 21, wherein said non-axisymmetric magnetic field includes a non-axisymmetric periodic magnetic field.

23. The method of claim 21, wherein said non-axisymmetric magnetic field includes a non-axisymmetric permanent magnetic field.

24. The method of claim 21, wherein said non-axisymmetric magnetic field includes a non-axisymmetric periodic permanent magnetic field.

25. The method of claim 21, wherein said non-axisymmetric magnetic field includes at least one quadrupole magnetic field.

26. The method of claim 21, wherein said non-axisymmetric magnetic field includes a periodic quadrupole magnetic field.

27. The method of claim 18, wherein said focusing channel comprises a non-axisymmetric magnetic field for focusing and transporting said charged-particle beam.

28. The charged-particle beam system of claim 27, wherein said non-axisymmetric magnetic field includes a non-axisymmetric periodic magnetic field.

29. The charged-particle beam system of claim 27, wherein said non-axisymmetric magnetic field includes a non-axisymmetric permanent magnetic field.

30. The charged-particle beam system of claim 27, wherein said non-axisymmetric magnetic field includes a non-axisymmetric periodic permanent magnetic field.

31. The charged-particle beam system of claim of 27, wherein said non-axisymmetric magnetic field includes at least one quadrupole magnetic field.

32. The charged-particle beam system of claim of 27, wherein said non-axisymmetric magnetic field includes a periodic quadrupole magnetic field.

* * * * *